Patented July 21, 1953

2,646,400

UNITED STATES PATENT OFFICE 2,646,400

METHOD OF INHIBITING CORROSION OF METALS

William B. Hughes, Bartlesville, Okla., assignor to Cities Service Research and Development Company, New York, N. Y., a corporation of New Jersey No Drawing. Application February 24, 1951, Serial No. 212,681

4 Claims. (Cl. 252—8.55)

This invention relates to inhibiting corrosion of metals and is more particularly concerned with improved compositions and processes for treating natural petroleum oil-brine mixtures to reduce their corrosive action upon production, transmission, storage, and other oil field equipment.

It is a well known fact that many oil producing formations yield with the crude oil a brine which is extremely corrosive in its action upon metal tubing, casings, pumps, and other oil producing and collection equipment, and that this type of corrosion is particularly noticeable in wells producing brines containing dissolved hydrogen sulfide, carbon dioxide, and other acidic materials. The problem is also complicated by the fact that the corrosive nature of the brine will vary from well to well, and corrosion inhibiting compositions which are effective at one location are not necessarily effective at others.

Various compositions have been proposed in the past for inhibiting corrosion, some water soluble, and some oil soluble. Since it has been found that if a sufficient amount of inhibitor is incorporated into either the brine phase or the oil phase of the well fluids, corrosion may be substantially inhibited, it has been the practice to use water-soluble inhibitors, such as those disclosed in U. S. Patent 2,496,596, to Moyer and Hersh, in wells producing but a small amount of brine per barrel of well fluid, and conversely, to use oil-soluble inhibitors in wells producing only small amounts of oil per barrel of well fluid. By so proceeding, it is possible to reduce to a minimum the amount of inhibitor required to effectively reduce corrosion.

It is an object of this invention to provide a series of oil-soluble compounds which are highly effective in reducing corrosion in wells producing corrosive brines, and particularly useful for substantially inhibiting corrosion in wells producing but small quantities of oil per barrel of well fluids.

I have discovered that compositions having the above desirable characteristics may be produced by reacting triethylenetetramine or tetraethylenepentamine with an equimolar quantity of an aldehyde of two or more carbon atoms. Compositions utilizing aliphatic aldehydes, such as acetaldehyde, propionaldehyde, butyraldehyde, heptaldehyde, and higher aldehydes are very effective, as are compositions utilizing heterocyclic aldehydes, such as furfural, or aromatic aldehydes, such as benzaldehyde and its homologues. The fact that the heterocyclic and aromatic aldehydes are useful in preparing my new composition is surprising in view of the fact that compositions prepared from diethylenetriamine and heterocyclic or aromatic aldehydes are of no value as corrosion inhibitors. Compositions prepared with formaldehyde are not useful in my process since they are too water soluble, and will not remain in the oil phase of the well fluids in sufficient concentration to inhibit corrosion.

It is believed that the main product formed by the reaction of the amine and the aldehyde is an imidazolidine of the formula

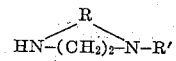

in which R is the aldehyde residue and R' is the amine residue. However, reactions of this type may take such various forms that it is quite probable that other compounds of unknown structure are formed, which may exert a synergistic effect. Since the exact composition of my new products is not fully known, I do not wish to be limited in this application to any particular structure of the corrosion inhibiting compounds.

In preparing my new compositions, I slowly add to a quantity of triethylenetetramine or tetraethylenepentamine an equimolar quantity of an aldehyde having two or more carbon atoms. Preferably, the aldehyde is heptaldehyde, benzaldehyde, or furfural, since these aldehydes yield products having the highest inhibiting powers, but other aldehydes are also useful in producing compositions of high inhibiting powers. Caution should be observed in adding the aldehyde to the amine, since the reaction takes place spontaneously with the evolution of considerable heat, and if the aldehyde is added too fast, the mixture tends to boil over. The mixture is then dehydrated by heating to drive off water split out in the reaction. Generally about thirty minutes heating at a temperature slightly over 100° C. is sufficient, but this time may vary within wide limits, depending upon the size of the batch and upon the aldehyde used. If desired, benzene may be added to the amine prior to the addition of the aldehyde, in order to render the mixture more fluid during the reaction, and also to act as an entrainer in carrying the water overhead in the dehydration step.

The effectiveness of my compositions in inhibiting the corrosiveness of oil field brines may be better and more fully understood by reference to certain tests which I have conducted using natural brines taken from producing wells together with oil from the same well. The test procedure, as hereafter described, involved a measurement of the corrosive action of these well fluids, as inhibited with the compositions described above, upon test strips of hot rolled steel, and a comparison thereof with the results obtained by subjecting identical test strips to the corrosive action of well fluids alone.

In testing the compositions, cleaned and numbered one-quart bottles were purged with natural gas. Oil saturated with hydrogen sulfide by bubbling the gas through the liquid for about three hours was added to the half-full mark on the bottle. Brine containing carbon dioxide and hydrogen sulfide in varying amounts as received from the well, was then added to almost completely fill the bottle. A quantity of my new compounds was then added to each bottle in an amount of 50 parts per million, based on the oil content of the bottle. The weighed steel strips were then affixed in such manner that the mid-point of the test strip was approximately at the interfacial level of the brine and oil.

At all times precautions were maintained to exclude air from the bottles by frequent and liberal purging with oxygen-free natural gas. The bottles containing the oil, the brine, and the strips were then mounted upon the periphery of a horizontal drum, which was slowly revolved so as to alternately bring the surface of the steel strip in contact with the oil and with the brine. At the end of two weeks the bottles were taken off the drum and the strips removed. The strips were first washed in kerosene and then methanol, and finally water, prior to cleaning. Cleaning consisted of carefully treating in one weight per cent hydrochloric acid solution for a few seconds at a time, washing with water, and thoroughly wiping with cheese cloth between each acid treatment. When the original lustre had been restored as nearly as possible with a minimum amount of acid treating, the strips were again washed in methanol followed by acetone. The dry strips were then reweighed to determine the weight loss; blanks were run to provide a basis for comparison.

Changes in the weight of the test strips during the corrosion test were taken as a measurement of the effectiveness of the inhibitor compositions, expressed as a protection percentage. Thus if the blank lost, for example, 100 mg. during the course of the test and the test strip subjected to the brine and oil containing our inhibiting compositions lost 5 mg., the per cent effectiveness would be 95 per cent. In the same manner if the test strip exposed to the uninhibited well fluids lost say 50 mg., while the loss of the test strip exposed to the inhibited well fluids was 4 mg., then the percentage of protection would be 92 per cent.

For example, in a test in which the inhibitor was a product prepared by reacting equimolar quantities of triethylenetetramine and heptaldehyde, the test strip in the inhibited oil-brine mixture showed a loss of 1.1 mg., whereas a test strip in the same, but uninhibited oil-brine mixture, showed a loss of 33.3 mg., giving this particular composition a protection percentage of 97 per cent. An inhibitor formulated from triethylenetetramine and benzaldehyde in equimolar quantities, when tested in a similar manner, showed a loss of 2.5 mg. on the test strip exposed to the inhibited oil-brine mixture, whereas the strip exposed to the uninhibited brine lost 41.0 mg. giving this particular composition a protection percentage of 94 per cent.

A test conducted on an inhibitor formulated from equimolar quantities of triethylenetetramine and furfural showed losses of 1.9 and 41.0 mg. for the strip exposed to the inhibited brine and the blank, respectively, a protection percentage of 95.

It will be apparent that, while an inhibitor concentration of 50 p. p. m. was established as a test standard for comparison purposes, more or less inhibitor may be used, and the protection obtained will vary according to the concentration of the inhibitor. In actual use in the field the concentration must, of course, be adjusted to the particular well, depending on the corrosiveness of the brine. Thus, in wells producing brines which are not particularly corrosive, it may be possible to use the inhibitor in concentrations as low as 10 p. p. m., while in wells producing strongly corrosive brines, it may be necessary to use concentrations of inhibitor far in excess of 50 p. p. m. In any event, the inhibitor will be added in a small amount, but in an amount sufficient to substantially inhibit the corrosion of metal producing and gathering equipment.

It will thus be evident that corrosion may be reduced to a value of one tenth or less of the corrosion due to the natural flow of well fluids through the well tubing and gathering lines, by the incorporation of very minor quantities of our new compounds into the well fluid.

In using my improved compositions for protecting oil well tubing, casing, and other equipment which comes in contact with the corrosive oil-brine production, I find that excellent results may be obtained by injecting an appropriate quantity of a selected composition into a producing well so that it may mingle with the oil-brine mixture and come into contact with the casing, tubing, pumps, and other producing equipment. I may, for example, introduce the inhibiting composition into the top of the casing, thus causing it to flow down into the well and thence back through the tubing, etc. In general, I have found that this procedure suffices to inhibit corrosion throughout the entire system of production, and collection, even including field tankage.

The nature of the inhibiting action of my improved compositions is not fully understood, but apparently the compositions act to preferentially wet the surface of the metal equipment with oil, thus excluding brine from contact with the metal. In any event, however, no matter what the mechanics of the corrosion inhibiting may be, they are extremely and surprisingly effective in protecting metal parts from corrosion even when used in amounts of fifty parts per million or less based on the oil content of the well fluids.

It is to be understood that the improved compositions of my invention are not limited to use alone and may be employed along with other agents commonly introduced into producing oil wells for breaking emulsions, limiting scale formation, etc. It is further evident that my invention is not restricted to the use of improved compositions for inhibiting corrosion in oil wells but may be employed to perform this function in the presence of corrosive brines of other origin.

Having now described my invention, what I claim as new and useful is:

1. The process of reducing corrosion of metals when exposed to corrosive oil well brines which comprises incorporating in corrosive oil well fluids a small but sufficient quantity of a compound prepared by reacting approximately equimolar quantities of a polyethyleneamine selected from the group consisting of triethylenetetramine and tetraethylenepentamine with an aldehyde containing more than one carbon atom, at temperatures below the boiling point of the reactants, and thereafter heating the reaction mixture at temperatures above 100° C. to drive off water formed in the reaction and thereafter causing the well fluids to flow in contact with the metal to be protected.

2. The process according to claim 1 in which the aldehyde is heptaldehyde.

3. The process according to claim 1 in which the aldehyde is furfural.

4. The process according to claim 1 in which the aldehyde is benzaldehyde.

WILLIAM B. HUGHES.

References Cited in the file of this patent

UNITED STATES PATENTS

| Number | Name | Date |
|---|---|---|
| 1,771,985 | Calcott et al. | Aug. 5, 1930 |
| 2,426,318 | Menaul | Aug. 26, 1947 |
| 2,466,517 | Blair et al. | Apr. 5, 1949 |
| 2,468,163 | Blair et al. | Apr. 26, 1949 |
| 2,496,596 | Moyer et al. | Feb. 7, 1950 |
| 2,596,273 | Moyer et al. | May 13, 1952 |